US012595642B2

(12) United States Patent
Teranishi et al.

(10) Patent No.: US 12,595,642 B2
(45) Date of Patent: Apr. 7, 2026

(54) STEERING DEVICE AND WORK MACHINE

(71) Applicant: KOMATSU LTD., Tokyo (JP)

(72) Inventors: Yuichi Teranishi, Tokyo (JP); Yuita Takenaka, Tokyo (JP); Keisuke Isomura, Tokyo (JP); Yasunari Kato, Tokyo (JP)

(73) Assignee: KOMATSU LTD., Tokyo (JP)

( * ) Notice: Subject to any disclaimer, the term of this patent is extended or adjusted under 35 U.S.C. 154(b) by 768 days.

(21) Appl. No.: 17/912,240

(22) PCT Filed: Mar. 18, 2021

(86) PCT No.: PCT/JP2021/010959
§ 371 (c)(1),
(2) Date: Sep. 16, 2022

(87) PCT Pub. No.: WO2021/193319
PCT Pub. Date: Sep. 30, 2021

(65) Prior Publication Data
US 2023/0134225 A1 May 4, 2023

(30) Foreign Application Priority Data

Mar. 26, 2020 (JP) ................................. 2020-055999

(51) Int. Cl.
E02F 9/22 (2006.01)
B62D 1/12 (2006.01)

(52) U.S. Cl.
CPC ................ E02F 9/225 (2013.01); B62D 1/12 (2013.01)

(58) Field of Classification Search
CPC .......... B62D 1/12; B62D 12/00; B62D 6/008; B62D 5/09; B62D 5/28; B62D 5/091;
(Continued)

(56) References Cited

U.S. PATENT DOCUMENTS

2019/0017245 A1* 1/2019 Takenaka ................. B62D 5/28
2019/0071119 A1 3/2019 Takenaka et al.
(Continued)

FOREIGN PATENT DOCUMENTS

JP 2017-35959 A 2/2017
JP 2020-26230 A 2/2020
(Continued)

OTHER PUBLICATIONS

The International Search Report for the corresponding international application No. PCT/JP2021/010959, issued on May 11, 2021.
(Continued)

Primary Examiner — Valentin Neacsu
Assistant Examiner — Tyler Jay Stanley
(74) Attorney, Agent, or Firm — Spencer Fane LLP

(57) ABSTRACT

A wheel loader includes a vehicle body frame, a transmission mechanism, a support section, a movable section, a joystick lever, and an urging mechanism. The transmission mechanism transmits a movement of the vehicle body frame. The support section is fixed with respect to the vehicle body frame. The movable section is connected to the transmission mechanism and is movably supported by the support section. The movement of the vehicle body frame is input to the movable section. The joystick lever accepts an operation to move with respect to the movable section by the operation. The urging mechanism adjusts a movement of the movable section with respect to the support section.

10 Claims, 17 Drawing Sheets

(58) Field of Classification Search
CPC .................... G05G 1/04; G05G 9/047; G05G
2009/04766; F15B 13/0422
USPC ................................................. 180/235, 449
See application file for complete search history.

(56) References Cited

U.S. PATENT DOCUMENTS

| | | | | |
|---|---|---|---|---|
| 2019/0187742 A1* | 6/2019 | Hettegger | .............. | G05G 9/047 |
| 2020/0317250 A1 | 10/2020 | Teranishi et al. | | |
| 2021/0156117 A1* | 5/2021 | Teranishi | .............. | G05G 9/047 |
| 2021/0156118 A1 | 5/2021 | Teranishi et al. | | |

FOREIGN PATENT DOCUMENTS

| | | | |
|---|---|---|---|
| WO | 2017/209058 A1 | 12/2017 |
| WO | 2019/234989 A1 | 12/2019 |
| WO | 2020/036035 A1 | 2/2020 |

OTHER PUBLICATIONS

The extended European search report for the corresponding European application No. 21776154.3, issued on Feb. 16, 2024.

* cited by examiner

STEERING DEVICE AND WORK MACHINE

CROSS-REFERENCE TO RELATED APPLICATIONS

This application is a U.S. National stage application of International Application No. PCT/JP2021/010959, filed on Mar. 18, 2021. This U.S. National stage application claims priority under 35 U.S.C. § 119(a) to Japanese Patent Application No. 2020-055999, filed in Japan on Mar. 26, 2020, the entire contents of which are hereby incorporated herein by reference.

TECHNICAL FIELD

The present invention relates to a steering device and a work machine.

BACKGROUND INFORMATION

As an articulated work machine, a configuration is disclosed in which the steering angle is changed by controlling the flow rate of oil supplied to a hydraulic actuator arranged over a front frame and a rear frame (for example, see Japanese Laid-open Patent Application Publication No. 2020-026230). In the work machine shown in Japanese Laid-open Patent Application Publication No. 2020-026230, the flow rate of oil supplied to the hydraulic actuator changes based on the operation angle of the joystick lever from a predetermined position with respect to the base member rotatably supported by the support section, and steering angle is changed. The change in steering angle is transmitted to the base member via the transmission mechanism, and the base member also rotates in response to the change in steering angle. When the joystick lever returns to a predetermined position with respect to the base member due to the rotation of the base member, the change of the steering angle is stopped and the stopped steering angle is maintained.

SUMMARY

However, in the configuration of Japanese Laid-open Patent Application Publication No. 2020-026230, backlash may occur in a gear, an intermediate shaft, or the like provided in the transmission mechanism, and the base member may be in a state of being movable in the rotational direction. In this case, when the operator operates the joystick lever, the base member also rotates together, which causes looseness and deteriorates the operation feeling.

An object of the present disclosure is to provide a work machine and a steering device capable of improving the operation feeling.

The work machine according to the first disclosure includes a body, a movement transmission mechanism, a support section, a movable section, an operating member, and an urging mechanism. The movement transmission mechanism transmits a movement of the body. The support section is installed with respect to the body. The movable section is movably supported with respect to the support section. The movable section is connected to the movement transmission mechanism. A movement of the body is input to the movable section. The operating member receives an operation to move with respect to the movable section. The urging mechanism adjusts a movement of the movable section with respect to the support section.

The steering device according to the second disclosure includes a support section, a movable section, an operating member, and an urging mechanism. The support section can be installed with respect to the body. The movable section is movably supported with respect to the support section. The movable section is connected to a movement transmission mechanism that transmits a movement of the body. The movement of the body is input to the movable section. The operating member receives an operation to move with respect to the movable section. The urging mechanism adjusts the movement of the movable section with respect to the support section.

According to the present disclosure, it is possible to provide a work machine and a steering device capable of improving the operation feeling.

DESCRIPTION OF EMBODIMENTS

A wheel loader as an example of a work vehicle according to the present disclosure will be described below with reference to the drawings.

First Embodiment

Hereinafter, a wheel loader 1 of a first embodiment according to the present disclosure will be described.

<Configuration>
(Overview of Wheel Loader Configuration)

Figure 1:
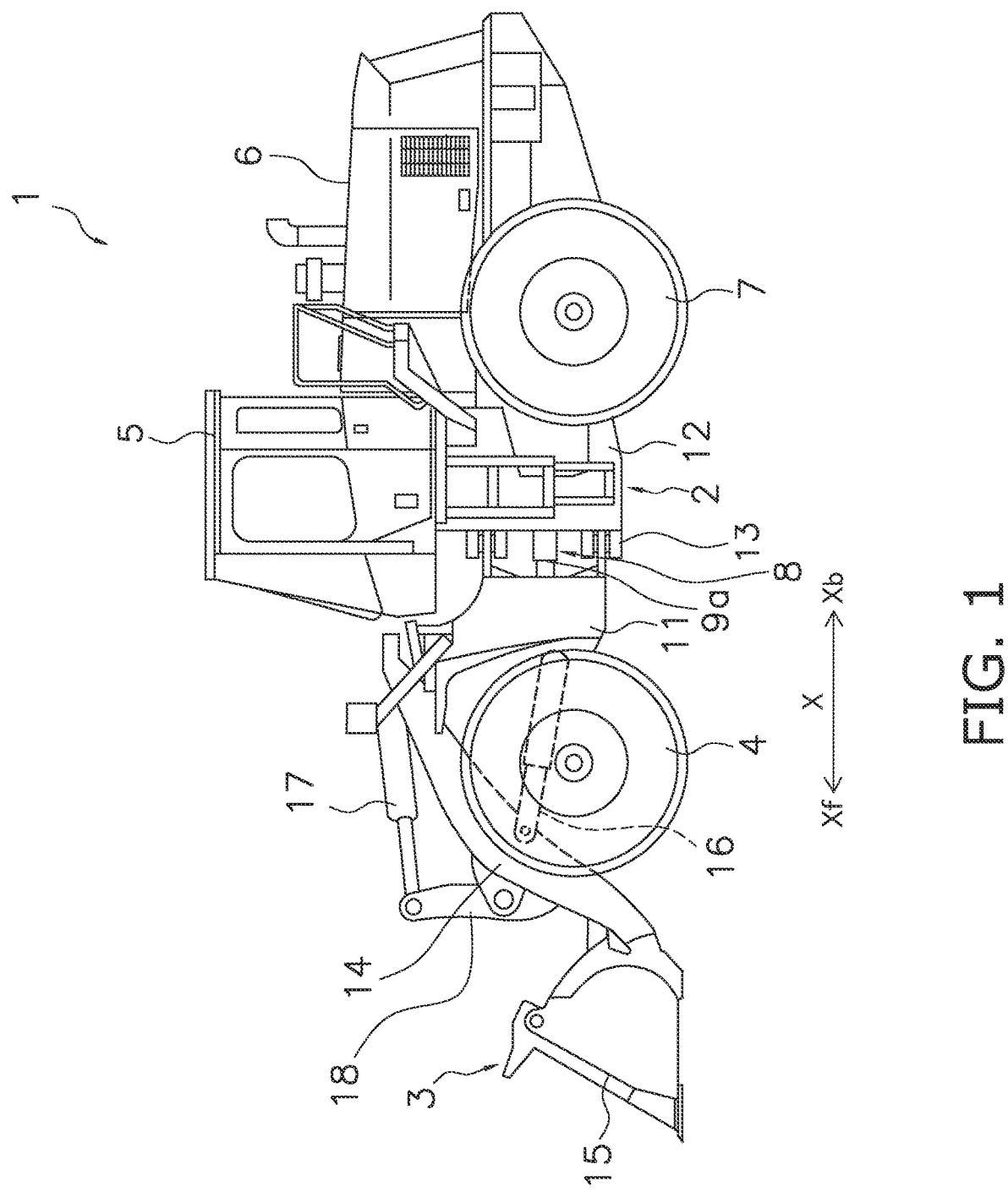
FIG. 1 is a side view showing a wheel loader of an exemplary embodiment according to the present disclosure.

FIG. 1 is a schematic view showing the configuration of the wheel loader 1 of the present embodiment. The wheel loader 1 of the present embodiment includes a vehicle body frame 2 (an example of a body), a work implement 3, a pair of front tires 4, a cab 5, an engine room 6, a pair of rear tires 7, a steering system 8, steering cylinders 9a and 9b (see FIG. 3), and a transmission mechanism 10 (an example of a movement transmission mechanism) (see FIG. 3).

In the following explanations, "front," "rear," "right," "left," "up," and "down" indicate directions relative to a state of looking forward from the driver's seat. "Vehicle width direction" and "left-right direction" have the same meaning. In FIG. 1, "X" indicates the front-back direction and "Xf" is used to indicate the forward direction and "Xb" is used to indicate the backward direction. In addition, the left-right direction is indicated with "Y," and "Yr is used to indicate the rightward direction and "Yl" is used to indicate the leftward direction in the following drawings.

The wheel loader 1 carries out work, such as earth and sand loading, by using the work implement 3.

The vehicle body frame 2 is a so-called articulated type and includes a front frame 11, a rear frame 12, and a coupling shaft portion 13. The front frame 11 is disposed in front of the rear frame 12. The front frame 11 corresponds to an example of a second frame, and the rear frame 12 corresponds to an example of a first frame. The coupling shaft portion 13 is provided at the center in the vehicle width direction and couples the front frame 11 and the rear frame 12 so as to be swingable with each other. The front tires 4 as the pair are attached to the left and right sides of the front frame 11. The rear tires 7 as the pair are attached to the left and right sides of the rear frame 12.

The work implement 3 is driven by hydraulic fluid from a work implement pump (not shown). The work implement 3 includes a boom 14, a bucket 15, a lift cylinder 16, and a bucket cylinder 17. The boom 14 is attached to the front frame 11. The bucket 15 is attached to the tip of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The boom 14 swings up and down due to the expansion and contraction of the lift cylinder 16. One end of the bucket cylinder 17 is attached to the front frame 11, and the other end of the bucket cylinder 17 is attached to the bucket 15 via the bell crank 18. The bucket 15 swings up and down due to the expansion and contraction of the bucket cylinder 17.

The cab 5 is disposed on the rear frame 12, and a joystick lever 41 for steering operation (see FIG. 2 described later), a lever for operating the work implement 3, various display devices are arranged inside the cab 5. The engine room 6 is disposed behind the cab 5 and on the rear frame 12, and houses the engine.

Figure 2:
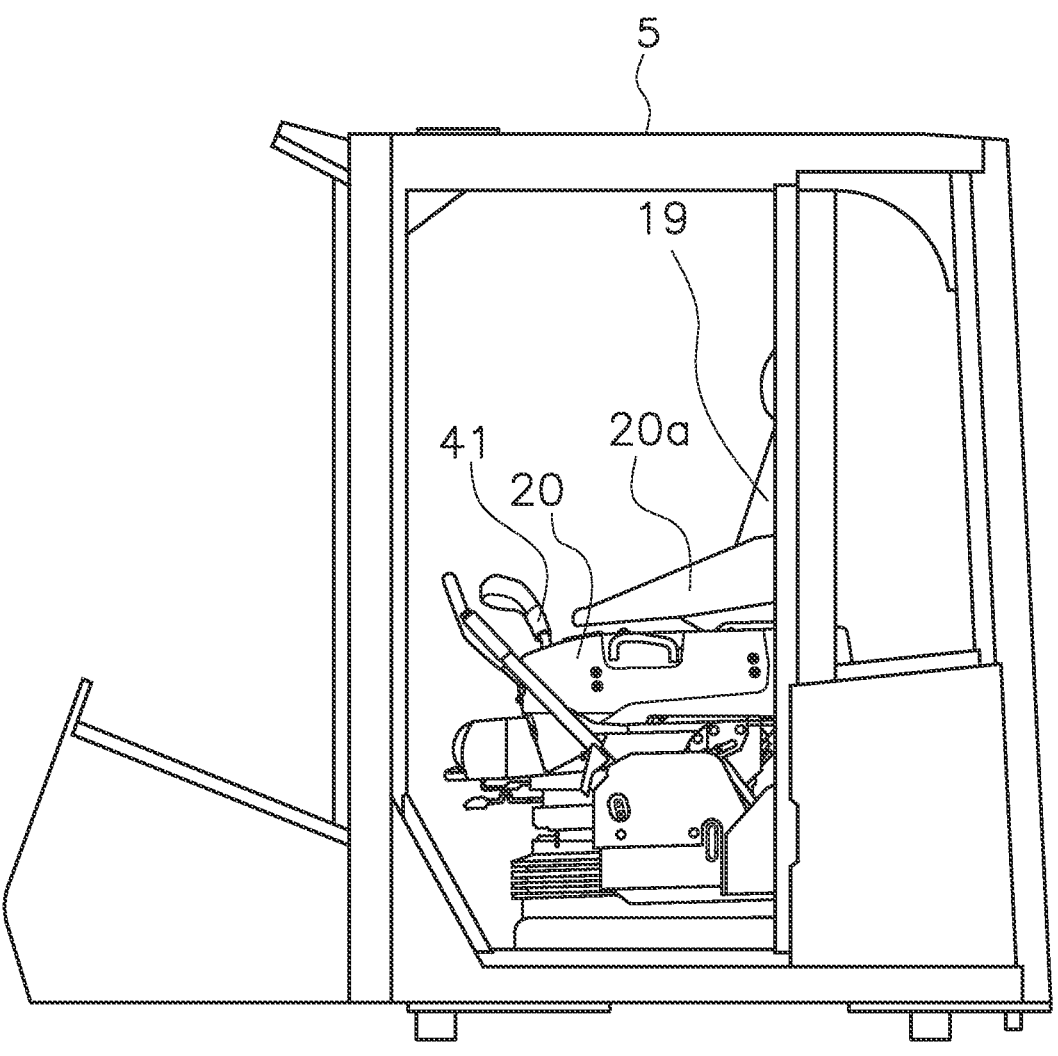
FIG. 2 is a side view showing the vicinity of a cab of FIG. 1.
Figure 2:
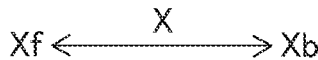

FIG. 2 is a partial side view of the cab 5. An operator's seat 19 is provided in the cab 5 and a console box 20 is disposed to the side of the operator's seat. An arm rest 20a is disposed on the upper side of the console box 20. The joystick lever 41 is disposed extending upward from the front end portion of the console box 20. The joystick lever 41 corresponds to an example of an operating member.

Figure 3:
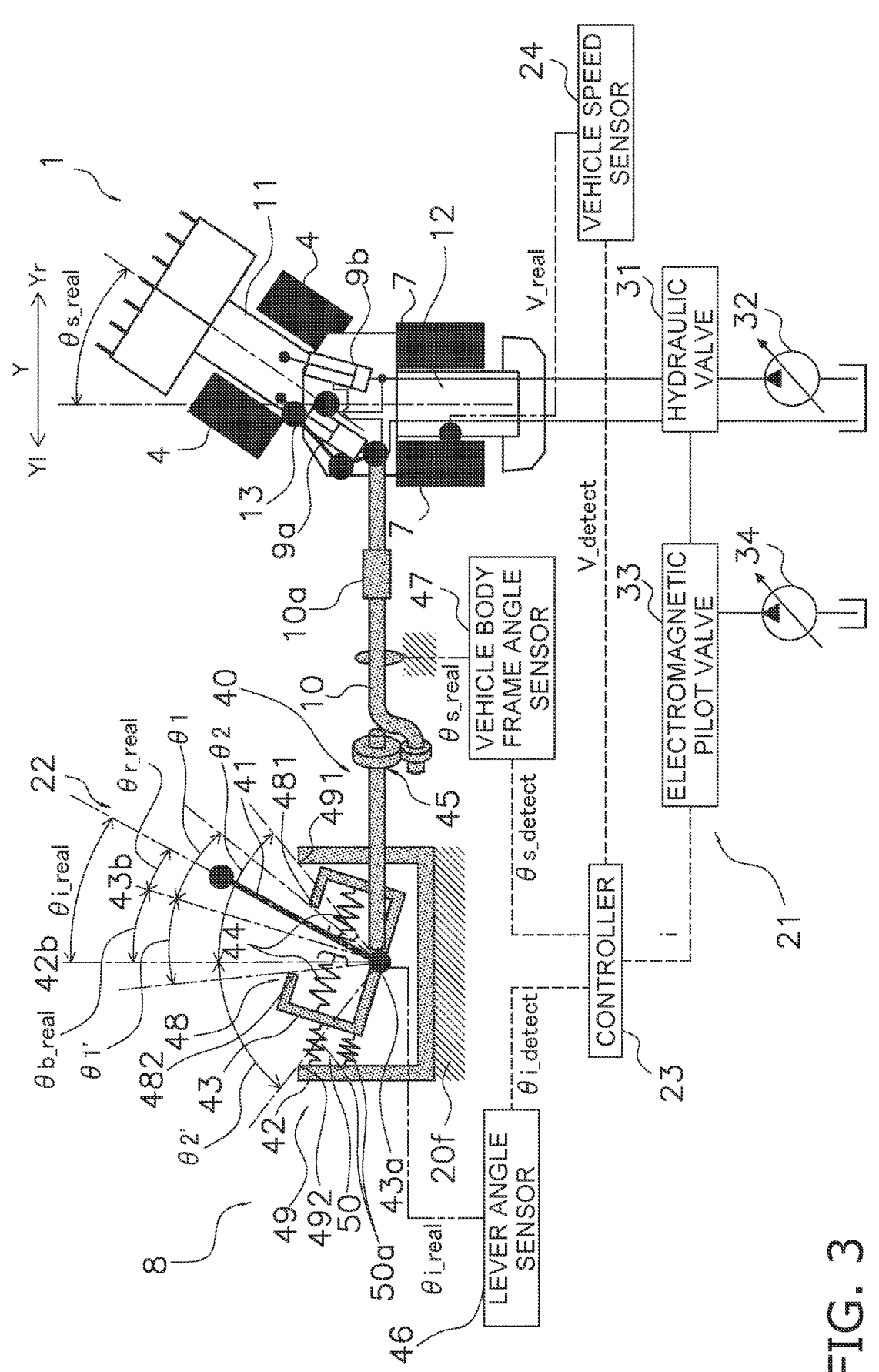
FIG. 3 is a configuration diagram showing a steering system of FIG. 1.

FIG. 3 is a configuration view showing the steering system 8. The steering system 8 changes the vehicle body frame angle of the front frame 11 with respect to the rear frame 12 by changing the flow rate of the oil supplied to the steering cylinders 9a and 9b, and changes the traveling direction of the wheel loader 1.

The pair of steering cylinders 9a and 9b are hydraulically driven. The pair of steering cylinders 9a and 9b are disposed side by side on the left and right sides in the vehicle width direction with the coupling shaft portion 13 interposed therebetween. The steering cylinder 9a is disposed on the left side of the coupling shaft portion 13. The steering cylinder 9b is disposed on the right side of the coupling shaft portion 13. One end of each of the steering cylinders 9a and 9b is attached to the front frame 11, and the other end of each of the steering cylinders 9a and 9b is attached to the rear frame 12.

When the steering cylinder 9a expands and the steering cylinder 9b contracts due to the hydraulic pressure from the steering system 8 described later, the actual vehicle body frame angle $\theta$s_real changes and the vehicle turns to the right. Further, when the steering cylinder 9a contracts and the steering cylinder 9b expands due to the hydraulic pressure from the steering system 8, the actual vehicle body frame angle $\theta$s_real changes and the vehicle turns to the left. In this embodiment, the actual vehicle body frame angle $\theta$s_real when the front frame 11 and the rear frame 12 are arranged along the front-rear direction is set to zero, the right side is set to a positive value, and the left side is set to a negative value.

(Transmission Mechanism 10)

The transmission mechanism 10 transmits information about the vehicle body frame angle $\theta$s_real of the front frame 11 with respect to the rear frame 12 to the steering device 22 of the steering system 8. The transmission mechanism 10 of the first embodiment mechanically transmits information on the vehicle body frame angle $\theta$s_real to the steering device 22.

The transmission mechanism 10 is mechanically connected to the vehicle body frame 2 and is connected to the movable section 40 of the steering system 8 described later. The transmission mechanism 10 transmits information on the vehicle body frame angle $\theta$s_real to the transmission section 45 of the movable section 40. The transmission mechanism 10 includes one or more components 10a including a gear, an universal joint, an intermediate shaft or the like. Backlash occurs in these components 10a.

(Steering System 8)

The steering system 8 includes an adjustment mechanism 21, a steering device 22, a controller 23, and a vehicle speed sensor 24. The adjustment mechanism 21 adjusts the drive outputs of the steering cylinders 9a and 9b. The steering device 22 includes a joystick lever 41 and the like, and an operator inputs the steering rotation instruction angle of the wheel loader 1 to the steering device 22. The controller 23 instructs the adjustment mechanism 21 to adjust the drive outputs of the steering cylinders 9a and 9b based on the steering rotation instruction angle input to the steering device 22. The vehicle speed sensor 24 detects the vehicle speed V of the wheel loader 1 and transmits the vehicle speed V to the controller 23 as a detection signal.

In FIG. 3, the transmission of signals based on electricity is shown by a dotted line, and the transmission based on hydraulic pressure is shown by a solid line. The detection by the sensor is indicated by a two-dot chain line.

(Adjustment Mechanism 21)

The adjustment mechanism 21 adjusts the flow rate of the oil supplied to the steering cylinders 9a and 9b. The adjustment mechanism 21 includes a hydraulic valve 31, a main pump 32, an electromagnetic pilot valve 33, and a pilot pump 34.

The hydraulic valve 31 is a flow rate adjusting valve that adjusts the flow rate of oil supplied to the steering cylinders 9*a* and 9*b* according to the input pilot pressure. As the hydraulic valve 31, for example, a spool valve is used. The main pump 32 supplies the hydraulic fluid for operating the steering cylinders 9*a* and 9*b* to the hydraulic valve 31.

The hydraulic valve 31 includes a valve body (not shown) that can be moved to a left steering position, a neutral position, and a right steering position. When the valve body is disposed at the left steering position in the hydraulic valve 31, the steering cylinder 9*a* contracts, the steering cylinder 9*b* expands, the actual vehicle body frame angle θs_real becomes small, and the body turns to the left.

When the valve body is disposed at the right steering position in the hydraulic valve 31, the steering cylinder 9*b* contracts, the steering cylinder 9*a* expands, the actual vehicle body frame angle θs_real becomes large, and the body turns to the right. When the valve body is disposed at the neutral position in the hydraulic valve 31, the actual vehicle body frame angle θs_real does not change.

The electromagnetic pilot valve 33 is a flow rate adjusting valve that adjusts the flow rate or pressure of the pilot hydraulic pressure supplied to the hydraulic valve 31 in response to a command from the controller 23. The pilot pump 34 supplies the hydraulic fluid for operating the hydraulic valve 31 to the electromagnetic pilot valve 33. The electromagnetic pilot valve 33 is, for example, a spool valve or the like, and is controlled according to a command from the controller 23.

The electromagnetic pilot valve 33 includes a valve body (not shown) that can be moved to the left pilot position, the neutral position, and the right pilot position. When the valve body is disposed at the left pilot position in the electromagnetic pilot valve 33, the hydraulic valve 31 is in the state of the left steering position. When the valve body is disposed at the right pilot position in the electromagnetic pilot valve 33, the hydraulic valve 31 is in the state of the right steering position. When the valve body is disposed at the neutral position in the electromagnetic pilot valve 33, the hydraulic valve 31 is in the state of the neutral position.

As described above, the hydraulic valve 31 is controlled by controlling the pilot pressure or the pilot flow rate from the electromagnetic pilot valve 33 in response to the command from the controller 23 and the steering cylinders 9*a* and 9*b* are controlled.

(Steering Device 22)

As shown in FIG. 3, the steering device 22 includes a joystick lever 41, a support section 42, a movable section 40, an urging member 44, a lever angle sensor 46, a vehicle body frame angle sensor 47, and an urging mechanism 50.

(Support Section 42)

The support section 42 is fixed to the frame 20*f* of the console box 20. The support section 42 may be a portion of the frame of the console box 20. Fixing the support section 42 does not have to be limited to the console box 20, and it is preferable that the support section 42 can be fixed with respect to the vehicle body frame 2. Further, fixing the support section 42 to the vehicle body frame 2 may means not only directly fixing the support section 42 to the vehicle body frame 2, but also indirectly fixing the support section 42 to the vehicle body frame 2 via the another member (console box 20 as in the example of the present embodiment). Further, fixing the support section 42 to the vehicle body frame 2 may mean a configuration that the support section 42 is fixed to the vehicle body frame 2 only when the operator operates another member.

(Movable Section 40)

The movable section 40 is connected to the transmission mechanism 10, and the operation of the vehicle body frame 2 is input to the movable section 40 via the transmission mechanism 10 so that the movable section 40 moves with respect to the support section 42.

The movable section 40 includes a base member 43 and a transmission section 45.

The base member 43 is rotatably supported by the support section 42. The base member 43 includes, for example, a shaft 43*a* as shown in FIG. 3, and the shaft 43*a* is rotatably supported by the support section 42. As a result, the base member 43 is rotatable about the shaft 43*a* with respect to the support section 42. Further, the base member 43 is configured to be rotatable with respect to the support section 42 by using the configuration that the support section 42 includes a shaft, a through hole is formed in the base member 43, and the shaft of the support section 42 inserts the through hole of the base member 43.

The transmission section 45 is connected to the base member 43. A transmission mechanism 10 is connected to the transmission section 45. Information on the actual vehicle body frame angle θs_real, which is the rotation angle of the front frame 11 with respect to the rear frame 12, is mechanically input to the transmission section 45. The transmission section 45 transmits the input information to the base member 43. The transmission section 45 rotates or moves together with the rotation of the base member 43. For example, the transmission section 45 includes a joint that rotates together with the base member 43, the transmission mechanism 10 includes a joint, and the joints are connected to each other to form a universal joint, thereby transmitting information on the vehicle body frame angle θs_real from the transmission mechanism 10 to the base member 43 via the transmission section 45.

The joystick lever 41 is rotatably disposed with respect to the base member 43 or the support section 42. The joystick lever 41 is configured to be rotatable with respect to the base member 43 by, for example, forming a through hole at base end of the joystick lever 41 and inserting the shaft 43*a* into the through hole. Further, the joystick lever 41 is configured to be rotatable with respect to the support section 42 by forming a shaft at the support section 42 and inserting the shaft into a through hole at the base end section of the joystick lever 41.

(Urging Member 44)

The urging member 44 is a spring member, and is interposed between the joystick lever 41 and the base member 43. The urging member 44 urges the joystick lever 41 to the base reference position 43*b* (an example of a predetermined position) with respect to the base member 43. The urging member 44 applies a counterforce to both the case where the joystick lever 41 is rotated to the right from the base reference position 43*b* and the case where the joystick lever 41 is rotated to the left from the base reference position 43*b*. When the operator is not gripping the joystick lever 41, the joystick lever 41 is positioned at the base reference position 43*b* by the urging force from the left and right rotation directions.

(Regulation Section 48)

The base member 43 is provided with a regulation section 48 that regulates the operation range of the joystick lever 41.

The regulation section 48 includes contact sections 481 and 482. The contact sections 481 and 482 regulate the rotation range of the joystick lever 41 with respect to the base member 43 within a predetermined angle range. When the longitudinal direction of the joystick lever 41 is disposed at the base reference position 43*b*, the rotation angle of the joystick lever 41 with respect to the base member 43 is set to zero, and the case where the joystick lever 41 is rotated to the right with respect to the base member 43 is represented by a plus, and the case where the joystick lever 41 is rotated to the left with respect to the base member 43 is represented by a minus. The actual relative angle θr_real of the joystick lever 41 with respect to the base member 43 is shown in FIG. 3.

When the joystick lever 41 is rotated to the right direction Yr with respect to the base member 43 and the actual relative angle θr_real of the joystick lever 41 with respect to the base member 43 reaches θ1 (positive value), the joystick lever 41 abuts on the contact section 481 of the base member 43 and the joystick lever 41 cannot be rotated to the right any more. Further, when the joystick lever 41 is rotated to the left direction Yl with respect to the base member 43 and θr_real reaches θ1' (negative value), the joystick lever 41 abuts on the contact section 482 of the base member 43 and the joystick lever 41 cannot be rotated to the left any more. That is, the joystick lever 41 is set to be rotatable with respect to the base member 43 within the range of angles θ1' to θ1. The predetermined angles θ1' and θ1 correspond to catch-up angles. Further, the predetermined angles θ1 and θ1' are set to, for example, 10 degrees and −10 degrees. The absolute value of the predetermined angle θ1 and the absolute value of the predetermined angle θ1' may be the same value or may be different.

Further, the joystick lever 41 is regulated by the support section 42 in addition to the base member 43. The support section 42 includes a regulation section 49 with which the joystick lever 41 abuts, and the regulation section 49 includes a right side contact portion 491 and a left side contact portion 492. The support section 42 regulates the base member 43 within a predetermined angle of θ2' (negative value) to θ2 (positive value) with respect to the support reference position 42b. The values of the predetermined angles θ2' and θ2 are set to, for example, −20 degrees and 20 degrees. The absolute value of the predetermined angle θ2' and the absolute value of the predetermined angle θ2 may have the same value or may be different.

Figure 4:
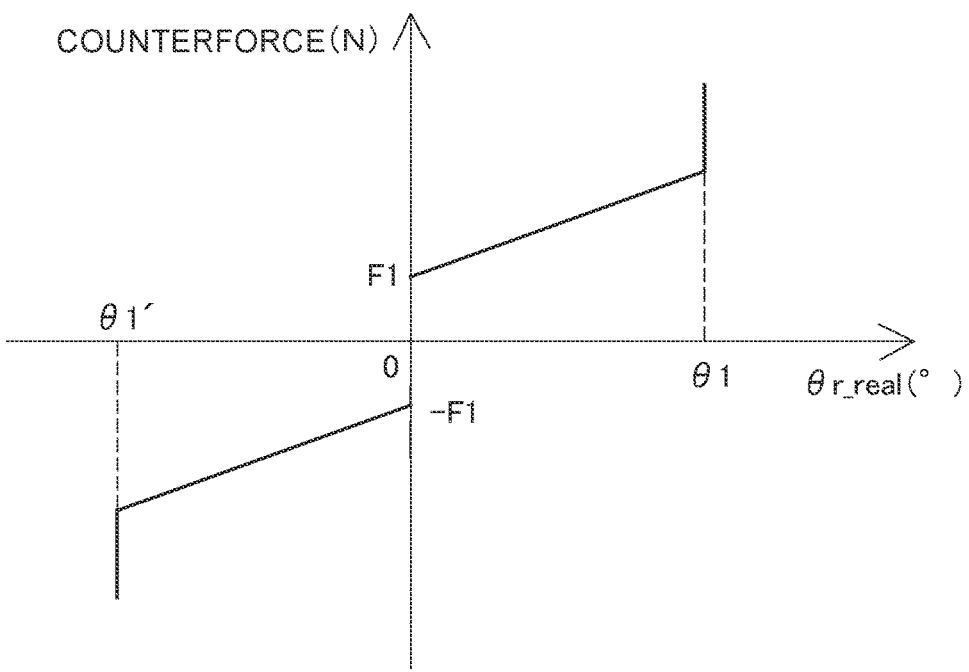
FIG. 4 is a diagram showing a counterforce of a spring member with respect to a difference between a lever angle and a base plate angle.

FIG. 4 is a view showing a counterforce applied to an actual relative angle θr_real of the joystick lever 41 with respect to the base member 43. In FIG. 4, the horizontal axis shows the actual relative angle θr_real of the joystick lever 41 with respect to the base member 43, and the vertical axis shows the counterforce. A positive value on the horizontal axis (relative angle) indicates the case where the joystick lever 41 is rotated to the right with respect to the base member 43, and a negative value on the horizontal axis (relative angle) indicates the case where the joystick lever 41 is rotated to the left with respect to the base member 43. A positive value on the vertical axis (counterforce) indicates a case where a counterforce is applied in the left rotation direction, and a negative value on the vertical axis (counterforce) indicates a case where a counterforce is applied in the right rotation direction.

While the actual relative angle θr_real is from 0° to θ1 or from 0° to θ1', a counterforce is applied by the spring characteristics of the urging member 44. As the initial counterforce, that is, when the joystick lever 41 is operated from the base reference position 43b, a counterforce of F1 or more is applied. As the absolute value of the actual relative angle θr_real increases, the counterforce applied to the operation of the joystick lever 41 also increases. When the actual relative angle θr_real reaches θ1 or θ1', the counterforce increases linearly. This is because the joystick lever 41 abuts on the contact sections 481 and 482 of the base member 43.

(Lever Angle Sensor 46)

The lever angle sensor 46 is composed of, for example, a potentiometer, and detects the actual lever angle θi_real of the joystick lever 41 with respect to the support section 42 as the detection value θi_detect of the lever angle.

Here, the support reference position 42b of the joystick lever 41 with respect to the support section 42 is shown in FIG. 3. When the longitudinal direction of the joystick lever 41 is maintained at the support reference position 42b, the actual vehicle body frame angle θs_real is controlled by the adjustment mechanism 21 so as to become 0° and the front frame 11 is disposed along the front-back direction with respect to the rear frame 12. When the joystick lever 41 is disposed at the support reference position 42b, the rotation angle of the joystick lever 41 with respect to the support section 42 is set to zero, and the case where the joystick lever 41 is rotated to the right with respect to the support section 42 is represented by a plus, and the case where the joystick lever 41 is rotated to the left with respect to the support section 42 is represented by a minus. The controller 23 performs the control so that the actual vehicle body frame angle θs_real becomes a value corresponding to the actual lever angle θi_real of the joystick lever 41 from the support reference position 42b. The actual base angle of the base member 43 with respect to the support section 42 is θb_real. The actual base angle θb_real corresponds to the rotation angle of the base reference position 43b of the base member 43 from the support reference position 42b. Further, when the base reference position 43b is disposed at the support reference position 42b, the rotation angle of the base member 43 with respect to the support section 42 is set to zero, and the case where the base member 43 is rotated to the right with respect to the support section 42 is represented by a plus, and the case where the base member 43 is rotated to the left with respect to the support section 42 is represented by a minus.

(Vehicle Body Frame Angle Sensor 47)

The vehicle body frame angle sensor 47 detects the actual vehicle body frame angle θs_real as the detection value θs_detect of the vehicle body frame angle. The vehicle body frame angle sensor 47 is disposed in the vicinity of the coupling shaft portion 13 arranged between the steering cylinders 9a and 9b, or on the transmission mechanism 10 or on the shaft 43a of the base member 43. The vehicle body frame angle sensor 47 is composed of, for example, a potentiometer, and the detection value θs_detect of the detected vehicle body frame angle is sent to the controller 23 as a detection signal.

A cylinder stroke sensor for detecting the stroke of the cylinder may be provided in each of the steering cylinders 9a and 9b, the detection values of these cylinder stroke sensors may be sent to the controller 23, and the detection value θs_detect of the vehicle body frame angle may be detected.

Further, since the vehicle body frame angle θs_real and the base angle θb_real, which is the rotation angle of the base member with respect to the support section 42, have a corresponding positional relationship by the transmission mechanism 10, the vehicle body frame angle sensor 47 may be provided on the shaft 43a of the base member 43. This is because the vehicle body frame angle can be detected by detecting the rotation angle of the base member 43 with respect to the support section 42.

Figure 5A:
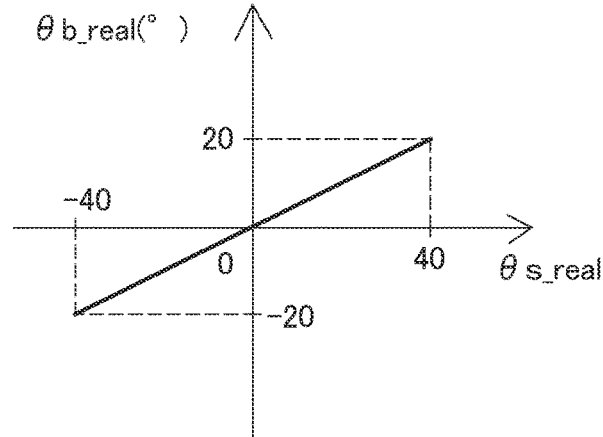
FIG. 5A is a diagram showing an example of a correspondence relationship between a vehicle body frame angle and a base angle.
Figure 5B:
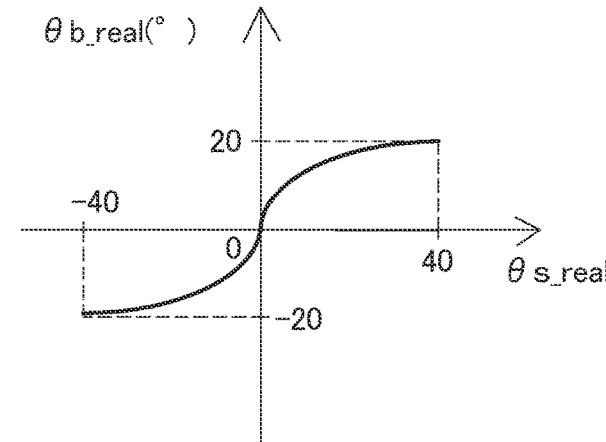
FIG. 5B is a diagram showing an example of a correspondence relationship between a vehicle body frame angle and a base angle.

FIGS. 5A and 5B show an example of the correspondence between the vehicle body frame angle θs_real and the base angle θb_real. In the examples of FIGS. 5A and 5B, the base angle θb_real can have a width of 20° while the vehicle body frame angle θs_real has a width of ±40°.

In FIG. 5A, the base angle θb_real has a proportional relationship with the vehicle body frame angle θs_real, and as the vehicle body frame angle θs_real increases, the base angle θb_real also increases.

In FIG. 5B, the graph is a curve. In the case where the absolute value of the vehicle body frame angle θs_real is small, the change in the base angle θb_real when the vehicle body frame angle θs_real changes is large. As the absolute value of the vehicle body frame angle θs_real becomes large, the change in the base angle θb_real when the vehicle body frame angle θs_real changes is small.

Further, a damper, friction, or both a damper and friction may be provided between the joystick lever 41 and the support section 42, or between the joystick lever 41 and the base member 43.

(Urging Mechanism 50)

The urging mechanism 50 adjusts the movement of the movable section 40 with respect to the support section 42. The urging mechanism 50 is a pressurization mechanism and suppresses loose movement that does not depend on the movement of the front frame 11. The loose movement means that when backlash occurs in the transmission mechanism 10, the base member 43 of the movable section 40 moves in the rotational direction together with the operation of the joystick lever 41 regardless of the movement of the front frame 11.

In the present embodiment, the urging mechanism 50 urges the base member 43 toward either one of the rotation directions. As shown in FIG. 3, the urging mechanism 50 includes one or more spring members 50a. One end of the spring member 50a is connected to the support section 42, and the other end of the spring member 50a is connected to the base member 43. In FIG. 3, the spring member 50a urges the base member 43 by, for example, attracting the base member 43 in the left rotation direction. Not limited to this, the spring member 50a may urge the base member 43 by pushing the base member 43 in the right rotation direction. The position of the spring member 50a is not limited, and it is sufficient that the base member 43 can be urged in either the right rotation direction or the left rotation direction.

The urging force of the base member 43 by the urging mechanism 50 is set to be larger than the urging force of the urging member 44. For example, when backlash occurs in the transmission mechanism 10 and the base member 43 is in a state of being movable in the rotational direction, the base member 43 rotates due to the urging force of the urging member 44 accompanying the operation of the joystick lever 41 and looseness occurs. Therefore, by setting the urging force of the base member 43 by the urging mechanism 50 to be larger than the urging force of the urging member 44, the base member 43 is not rotated by the urging force of the urging member 44 accompanying the operation of the joystick lever 41. Since it is possible to suppress the occurrence of looseness.

(Controller 23)

Figure 6:
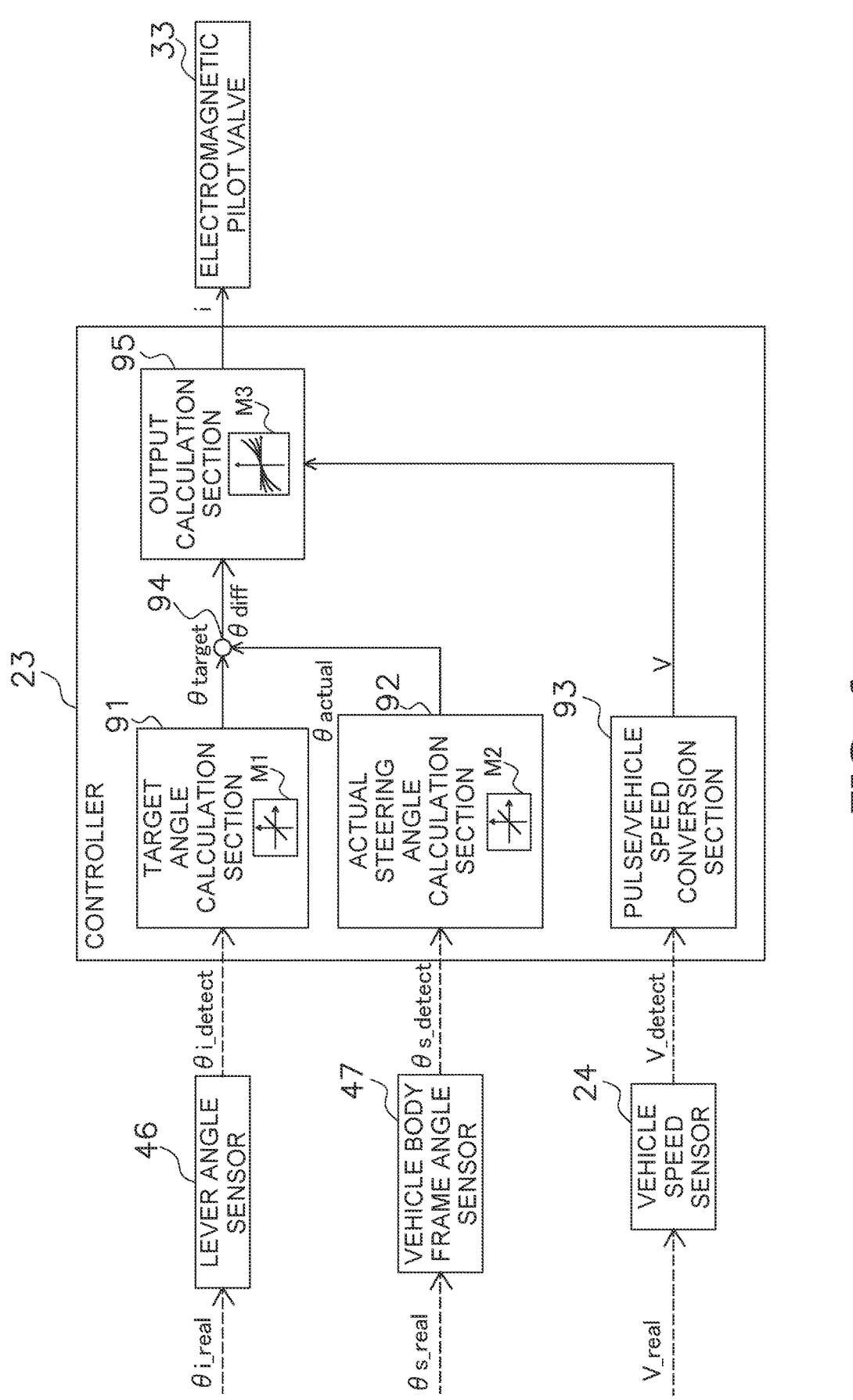
FIG. 6 is a block diagram showing input/output and calculation of the controller of FIG. 3.

FIG. 6 is a block diagram showing input/output and calculation of the controller 23.

The controller 23 includes a processor and a storage device. The processor is, for example, a CPU (Central Processing Unit). Alternatively, the processor may be a processor different from the CPU. The processor executes a process for controlling the wheel loader 1 according to a program. The storage device includes a non-volatile memory, such as a ROM (Read Only Memory), and a volatile memory, such as RAM (Random Access Memory). The storage device may include an auxiliary storage device, such as a hard disk or an SSD (Solid State Drive). A storage device is an example of a non-transitory recording medium that is readable by computer. The storage device stores programs and data for controlling the wheel loader.

The detection value θi_detect of the lever angle sensor 46, the detection value θs_detect of the vehicle body frame angle sensor 47, and the vehicle speed V_detect detected by the vehicle speed sensor 24 are input to the controller 23. The controller 23 outputs the electromagnetic pilot valve control current output i based on these values, and controls the electromagnetic pilot valve 33.

The controller 23 includes the functions of the following sections by executing the program while using the input detection value and the data stored in the storage device.

The controller 23 includes a target angle calculation section 91, an actual steering angle calculation section 92, a pulse/vehicle speed conversion section 93, a difference calculation section 94, and an output calculation section 95.

The lever angle detection value θi_detect is input to the controller 23 from the lever angle sensor 46, and the target angle calculation section 91 calculates the target angle θtarget using the map M1. Further, the detection value θs_detect of the steering angle is input to the controller 23 from the vehicle body frame angle sensor 47, and the actual steering angle calculation section 92 calculates the actual steering angle θactual using the map M2. The detection value V_detect of the vehicle speed is input to the controller 23 from the vehicle speed sensor 24. The pulse/vehicle speed conversion section 93 converts the input pulse to the vehicle speed and calculates the vehicle speed signal V.

The difference calculation section 94 calculates the difference θdiff between the target angle θtarget and the actual steering angle θactual. Then, the output calculation section 95 calculates the electromagnetic pilot valve control current output i from the difference diff and the vehicle speed signal V using the map M3, and outputs the electromagnetic pilot valve control current output i to the electromagnetic pilot valve 33. The maps M1 to M3 are stored in the storage device of the controller 23.

Figure 7A:
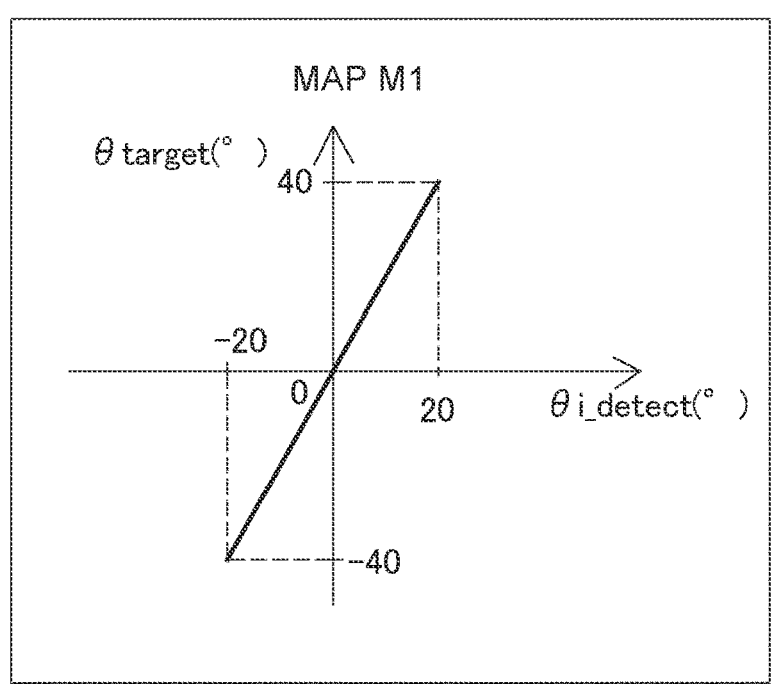
FIG. 7A is a diagram showing a map of FIG. 6.
Figure 7B:
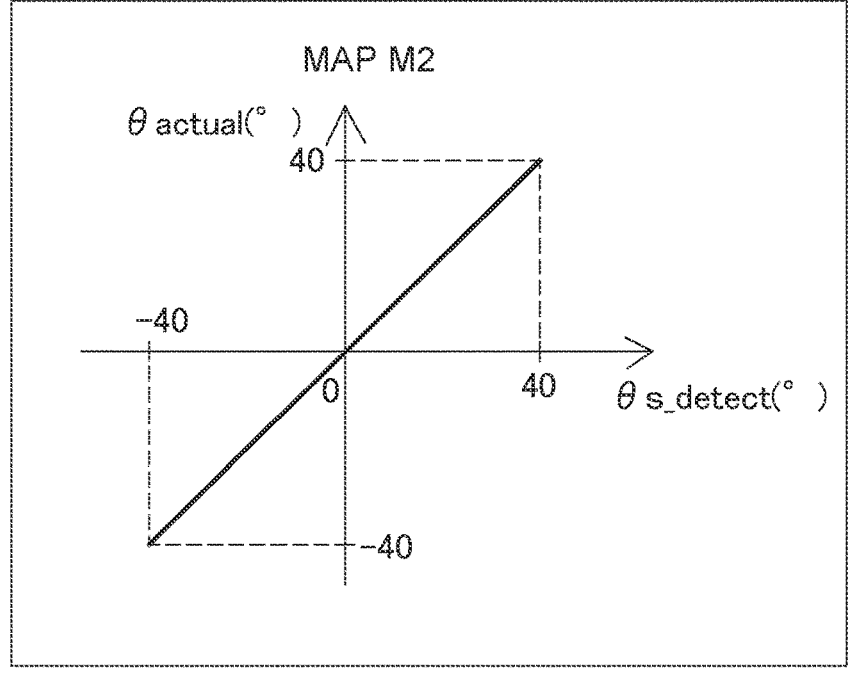
FIG. 7B is a diagram showing a map of FIG. 6.
Figure 7C:
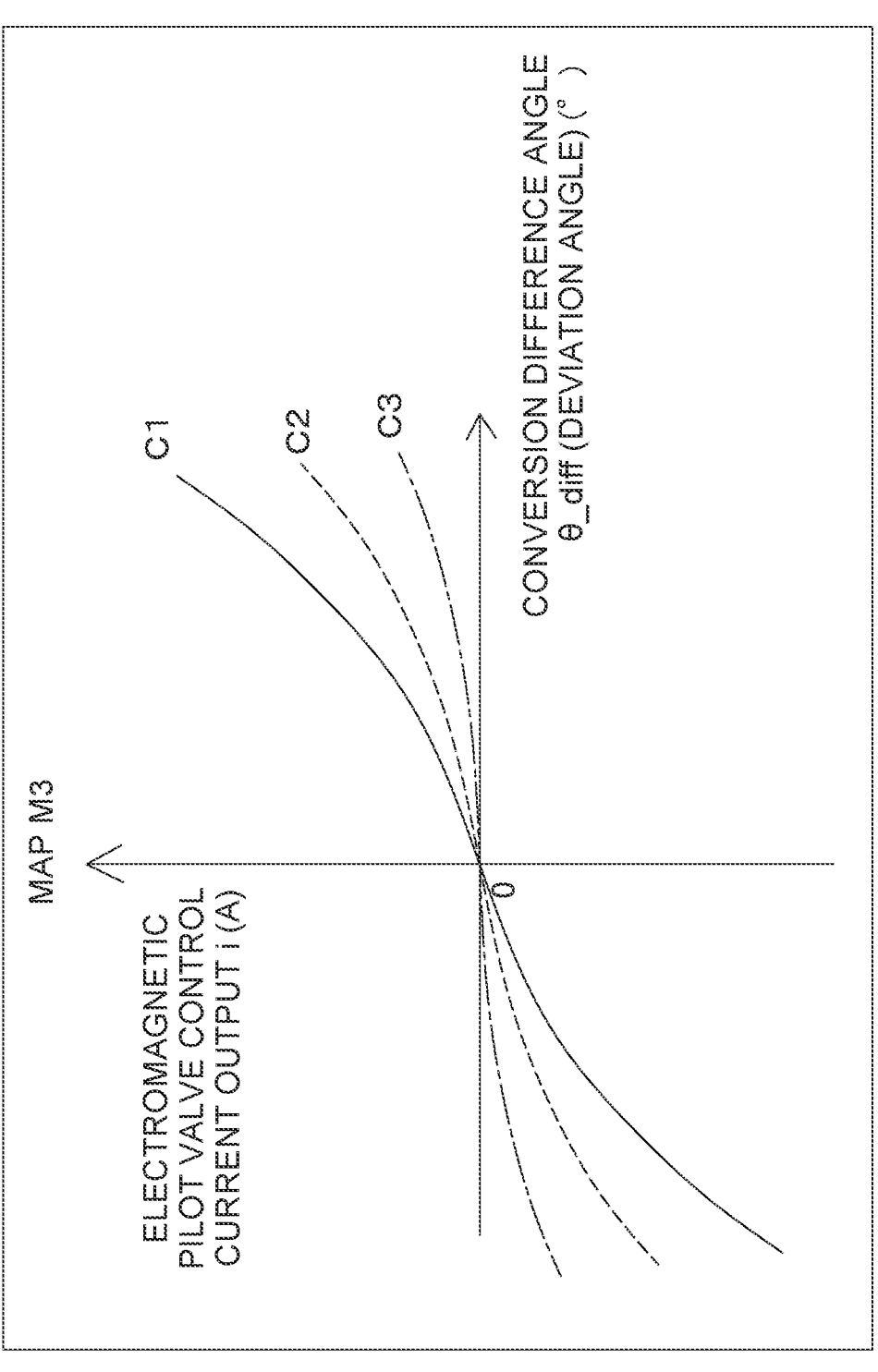
FIG. 7C is a diagram showing a map of FIG. 6.

FIG. 7A is a diagram showing an example of the map M1. FIG. 7B is a diagram showing an example of the map M2. FIG. 7C is a diagram showing an example of the map M3.

An example of the map M1 shown in FIG. 7A shows a graph of the relationship between the detection value θi_detect of the lever angle and the target angle θtarget. In this example, the detection value θi_detect of the lever angle and the target angle θtarget have a proportional relationship. Using this map M1, the controller 23 calculates the target angle θtarget from the detection value θi_detect of the lever angle. The target angle θtarget indicates a target angle of the vehicle body frame angle. Further, in the map M1 of FIG. 7A, θtarget=2×θi_detect, but the present disclosure is not limited to this.

An example of the map M2 shown in FIG. 7B shows a graph of the relationship between the detection value θs_detect of the steering angle and the actual steering angle θactual. In this example, the detection value θs_detect of the steering angle and the actual steering angle θactual have a proportional relationship. Using this map M2, the controller 23 calculates the actual steering angle θactual from the detection value θs_detect of the steering angle. The actual steering angle θactual indicates the actual angle of the vehicle body frame angle. Further, in the map M2 of FIG. 7B, θactual=1×θs_detect, and the value of θactual and the value of $\theta s\_detect$ are equal to each other, but the present disclosure is not limited to this.

An example of the map M3 of FIG. 7C represents an example of a curve showing the value of the electromagnetic pilot valve control current output i with respect to the deviation angle $\theta diff$.

The controller 23 stores curves showing the value of the electromagnetic pilot valve control current output i with respect to the difference angle $\theta diff$ for a plurality of vehicle speeds. In an example of the map M3 shown in FIG. 7C, for example, a curve C1 (solid line) when the vehicle speed is 10 km/h, a curve C2 (dotted line) when the vehicle speed is 20 km/h, and a curve C3 (one-dot chain line) when the vehicle speed is 30 km/h) are set. The faster the vehicle speed, the smaller the value of the electromagnetic pilot valve control current output i. As a result, as the vehicle speed becomes faster, the speed at which the actual vehicle body frame angle $\theta s\_real$ changes (which can also be called the angular velocity) becomes slower, and high-speed stability can be improved. Further, when the vehicle speed becomes slower, the speed at which the actual vehicle body frame angle $\theta s\_real$ changes (which can be said to be an angular velocity) becomes faster, and the operability at a low speed can be improved. When the vehicle speed V is between C1, C2, and C3, the electromagnetic pilot valve control current output i is determined by the interpolation calculation.

The controller 23 transmits a current to the electromagnetic pilot valve 33 based on FIG. 7C.

Although omitted in FIG. 3, the controller 23 may control the main pump 32, the pilot pump 34, and the like.

Further, the transmission/reception of signals between the controller 23 and the vehicle body frame angle sensor 47, the lever angle sensor 46, the vehicle speed sensor 24, and the electromagnetic pilot valve 33 may be performed wirelessly or by wire.

Further, the maps M1 to M3 may be linear or non-linear as long as the output is uniquely determined with respect to the input.

<Operation>

The control operation of the wheel loader 1 of the present embodiment will be described below. FIGS. 8A to 8F are views showing the operation of the steering device 22 and the state of the vehicle body frame 2. FIG. 9 is a flow chart showing the operation of the wheel loader 1 of the present embodiment.

Figure 8A:
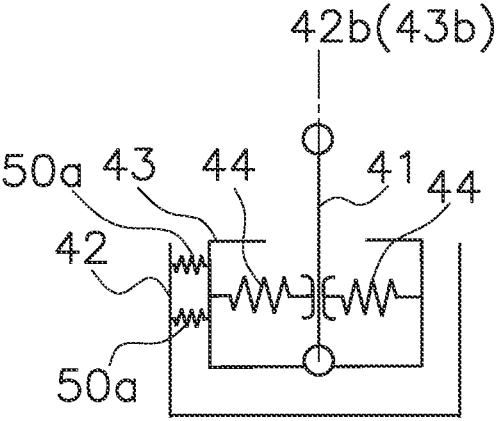
FIG. 8A is a view for explaining a control operation of the wheel loader of FIG. 1.
Figure 8A:
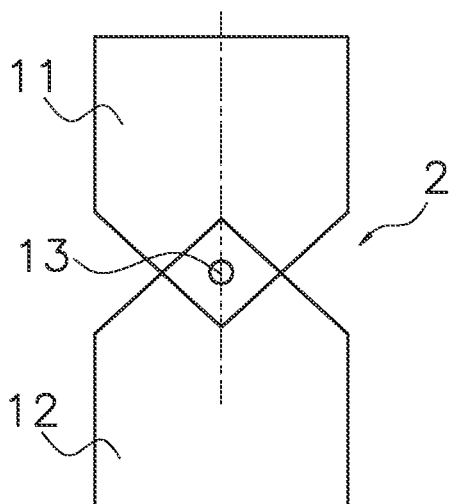
Figure 9:
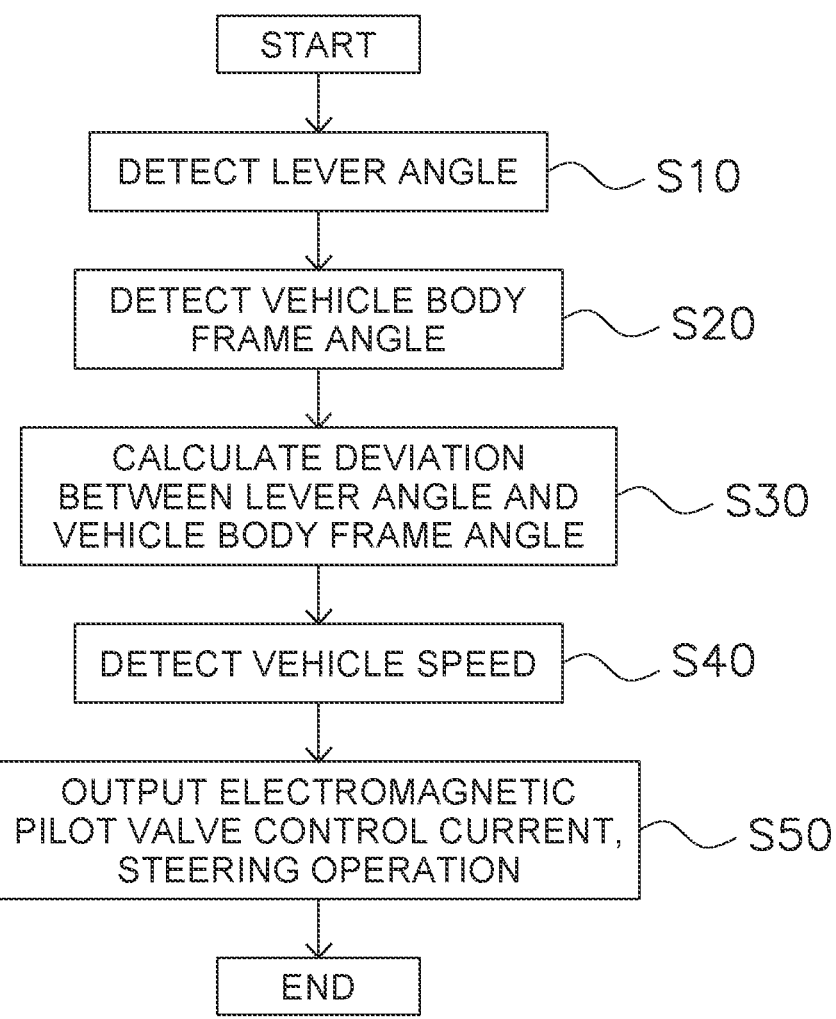
FIG. 9 is a flow chart showing a control operation of the wheel loader of FIG. 1.

As shown in FIG. 8A, in the state (also referred to as an initial position) where the base reference position 43b of the base member 43 coincides with the support reference position 42b of the support section 42, and the longitudinal direction of the joystick lever 41 also coincides with the support reference position 42b, the actual lever angle $\theta i\_real$ by the joystick lever 41 is zero.

At this time, the electromagnetic pilot valve 33 is in the neutral position. In this case, the hydraulic valve 31 is also in the neutral position. Therefore, the oil of the left and right steering cylinders 9a and 9b is not supplied or discharged, and the actual vehicle body frame angle $\theta s\_real$ is maintained at zero. As described above, since the actual vehicle body frame angle $\theta s\_real$ is also zero, the base member 43 is also located at the initial position.

Figure 8B:
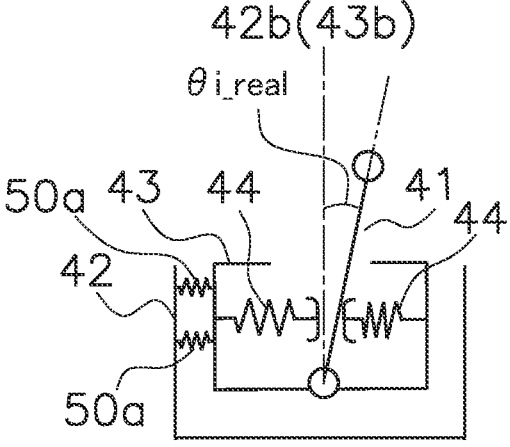
FIG. 8B is a view for explaining a control operation of the wheel loader of FIG. 1.
Figure 8B:
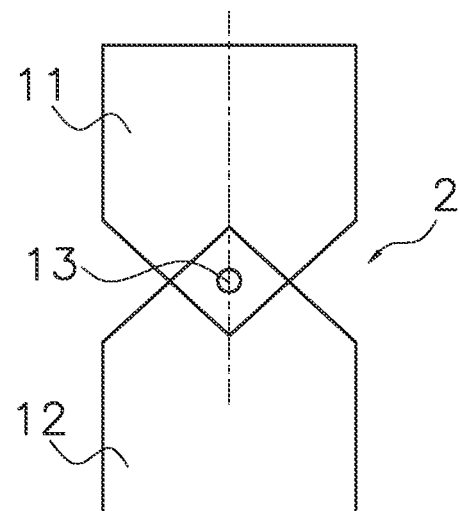

Then, the operator applies an operating force Fin to rotate the joystick lever 41 to the right from the support reference position 42b. When the operating force Fin exceeds the initial urging force F1 of the urging member 44, the joystick lever 41 rotates to the right and the actual lever angle $\theta i\_real$ increases, as shown in FIG. 8B. Since the relative angle $\theta r\_real$ with the base member 43 increases as the joystick lever 41 is moved to the right, the counterforce applied by the urging member 44 increases as shown in FIG. 4.

In step S10, the lever angle sensor 46 detects the actual lever angle $\theta i\_real$ of the joystick lever 41 operated by the operator as the detection value $\theta i\_detect$ of the lever angle.

Next, in step S20, the vehicle body frame angle sensor 47 detects the actual vehicle body frame angle $\theta s\_real$ as the detection value $\theta s\_detect$ of the vehicle body frame angle.

At this time, the actual vehicle body frame angle $\theta s\_real$ is in a zero state due to the delay in the reaction of the left and right steering cylinders 9a and 9b. Therefore, the detection value $\theta s\_detect$ of the vehicle body frame angle, which is the detection value by the vehicle body frame angle sensor 47, is zero. Since the actual vehicle body frame angle $\theta s\_real$ is almost zero, the base member 43 also does not rotate. Therefore, as shown in FIG. 8B, in the state where the joystick lever 41 is rotated to the right, the joystick lever 41 is in the state where it rotates to the right with respect to the base reference position 43b of the base member 43. Further, the joystick lever 41 is urged to return to the base reference position 43b (which can also be said to be the support reference position 42b in the state of FIG. 8B) by the urging member 44.

Next, in step S30, the controller 23 converts the detection value $\theta i\_detect$ of the detected lever angle into the target angle $\theta target$ using the map M1 shown in FIG. 7A. Further, the controller 23 converts the detection value $\theta s\_detect$ of the vehicle body frame angle into the actual steering angle $\theta actual$ using the map M2 shown in FIG. 7B. Further, the controller 23 calculates the difference between the target angle $\theta target$ and the actual steering angle $\theta actual$ to obtain the difference angle $\theta diff$.

Next, in step S40, the controller 23 performs conversion from the detection signal V_detect by the vehicle speed sensor 24 to obtain the vehicle speed V.

Next, in step S50, the controller 23 determines the electromagnetic pilot valve control current output i from the stored map M3 shown in FIG. 7C using the difference angle $\theta diff$ and the vehicle speed V, and give a command to the electromagnetic pilot valve 33.

Since the joystick lever 41 is rotated to the right, the electromagnetic pilot valve 33 is in the right pilot position, and the pilot pressure controlled by the electromagnetic pilot valve 33 is supplied to the hydraulic valve 31. By supplying the pilot pressure, the hydraulic valve 31 is in the right steering position, and the main hydraulic pressure is supplied to the steering cylinders 9a and 9b so as to extend steering cylinder 9a and contract the steering cylinder 9b.

As a result, the actual vehicle body frame angle $\theta s\_real$ gradually increases, and the front frame 11 is directed to the right with respect to the rear frame 12.

This change in the actual vehicle body frame angle $\theta s\_real$ is reflected in the angle of the base member 43 via the transmission mechanism 10.

Figure 8C:
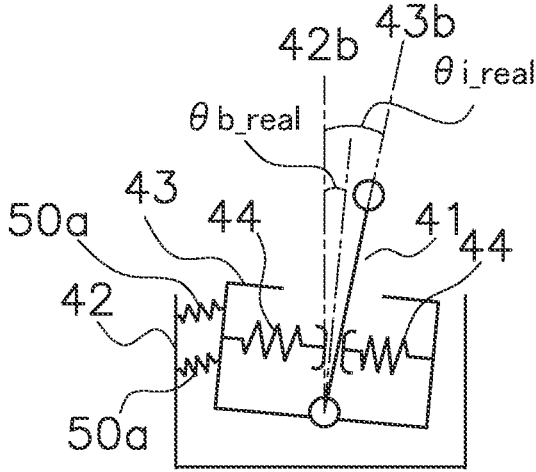
FIG. 8C is a view for explaining a control operation of the wheel loader of FIG. 1.
Figure 8C:
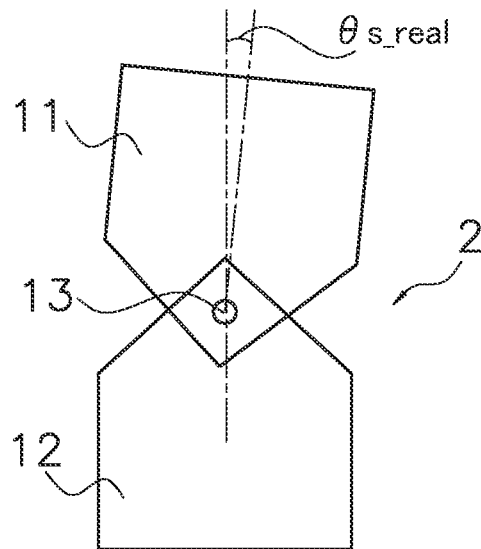

That is, as shown in FIG. 8C, the angle of the base member 43 also rotates at a position corresponding to the vehicle body frame angle $\theta s\_real$. In this way, when the base member 43 rotates toward the rotation position of the joystick lever 41, the deviation angle $\theta r\_real$ between the actual lever angle $\theta i\_real$ and the actual base angle $\theta b\_real$ becomes smaller as shown in FIG. 8C. Therefore, the urging force of the urging member 44 becomes smaller.

Figure 8D:
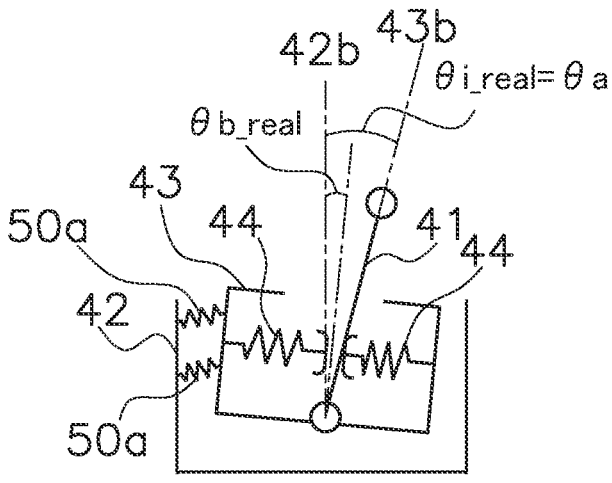
FIG. 8D is a view for explaining the control operation of the wheel loader of FIG. 1.
Figure 8D:
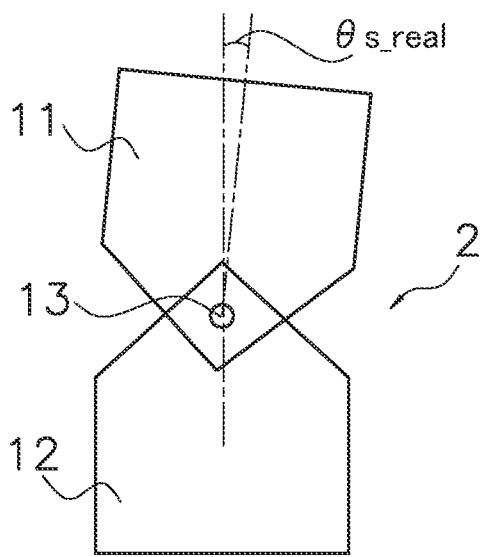

As shown in FIG. 8D, when the operator stops the joystick lever 41 at a predetermined actual lever angle $\theta i\_real = \theta a$, the actual vehicle body frame angle $\theta s\_real$ gradually increases, so that the difference angle $\theta diff$ becomes smaller.

Figure 8E:
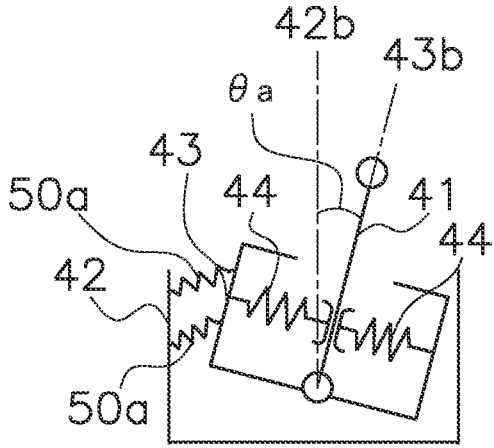
FIG. 8E is a view for explaining the control operation of the wheel loader of FIG. 1.
Figure 8E:
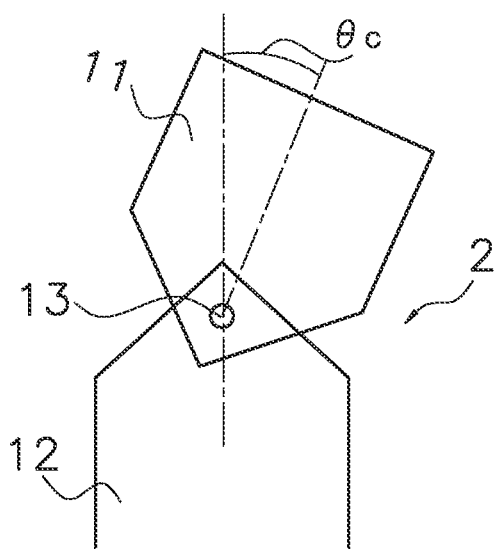

Then, as shown in FIG. 8E, when the actual vehicle body frame angle θs_real moves and the base angle θb_real becomes θa, the difference angle θdiff becomes zero. At this time, the electromagnetic pilot valve 33 is in the neutral position, and the hydraulic valve 31 is also in the neutral position. Therefore, oil is not supplied or discharged to the left and right steering cylinders 9a and 9b, and the actual vehicle body frame angle θs_real is maintained at θc obtained by converting the rotation angle θa according to FIG. 5A. Further, as shown in FIG. 8E, the base member 43 also rotates to the right by θa, and the joystick lever 41 is located at the base reference position 43b of the base member 43.

Figure 8F:
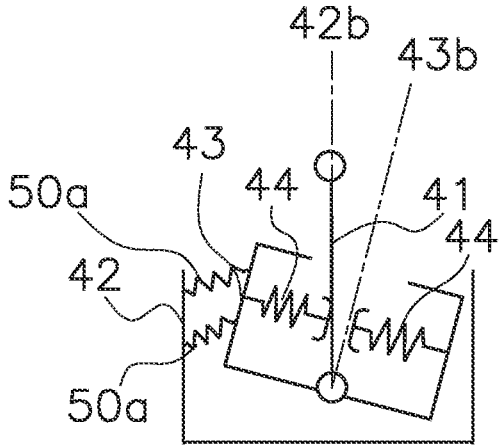
FIG. 8F is a view for explaining the control operation of the wheel loader of FIG. 1.
Figure 8F:
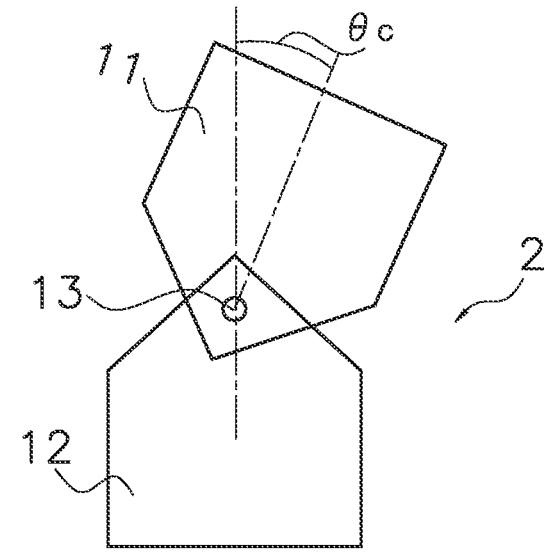

Next, the operator returns the joystick lever 41 from the right side position (θi_real=θa) toward the support reference position 42b (θi_real=zero). As shown in FIG. 8F, the joystick lever 41 is rotated to the left so that the joystick lever 41 is located at the support reference position 42b.

Before returning the joystick lever 41 to the support reference position 42b with respect to the support section 42 (state shown in FIG. 8E), the positional relationship between the joystick lever 41 and the base member 43 is the same as that in FIG. 8A. Therefore, when the joystick lever 41 is moved, the counterforce at the start of movement is the same as the counterforce at the start of movement from the initial position. That is, in the present embodiment, since the base member 43 rotates to a position corresponding to the actual vehicle body frame angle θs_real, the counterforce applied to the operation is determined according to the state of the electromagnetic pilot valve 33 (neutral position, right pilot position, and left pilot position) regardless of the position of the joystick lever 41.

At this time, the actual vehicle body frame angle θs_real is in the state of 6c due to the delay in the reaction of the left and right steering cylinders 9a and 9b. Further, since the actual base angle θb_real of the base member 43 is θa as well as the actual vehicle body frame angle θs_real, the urging member 44 urges the joystick lever 41 with respect to the base member 43 so that the joystick lever 41 is in the state of FIG. 8E.

Since the actual vehicle body frame angle θs_real is in the state of θc as described above, the difference angle θdiff decreases from zero and becomes negative. Then, the electromagnetic pilot valve 33 is in the left pilot position, the pilot pressure is supplied to the hydraulic valve 31, and the hydraulic valve 31 is in the left steering position. As a result, hydraulic pressure is supplied so that the steering cylinder 9b expands and the steering cylinder 9a contracts.

Due to this supply of the hydraulic pressure, the actual vehicle body frame angle θs_real gradually decreases from the rotation angle θc. This change in the actual vehicle body frame angle θs_real is reflected in the base member 43 via the transmission mechanism 10, and the base member 43 also rotates in the same manner as the change in the actual vehicle body frame angle θs_real.

Then, when the actual vehicle body frame angle θs_real becomes zero, the difference from the actual lever angle θi_real (=0) becomes zero. At this time, the electromagnetic pilot valve 33 is in the neutral position, and the hydraulic valve 31 is also in the neutral position. Therefore, oil is not supplied or discharged to the left and right steering cylinders 9a and 9b, and the actual vehicle body frame angle θs_real is also maintained at zero. As a result, the front frame 11 is returned to the direction along the front-back direction with respect to the rear frame 12.

Further, as the actual vehicle body frame angle θs_real decreases, the base member 43 rotates so that the actual base angle θb_real also becomes zero, and returns to the initial position (θb_real=0) as shown in FIG. 8A.

When the joystick lever 41 is rotated to the left side, the operation is the same as above and is omitted.

Second Embodiment

Next, the wheel loader 1? in a second embodiment of the present disclosure will be described. The wheel loader of the second embodiment has a different transmission mechanism configuration from the wheel loader 1 of the first embodiment. Therefore, this difference will be mainly explained.

Figure 10:
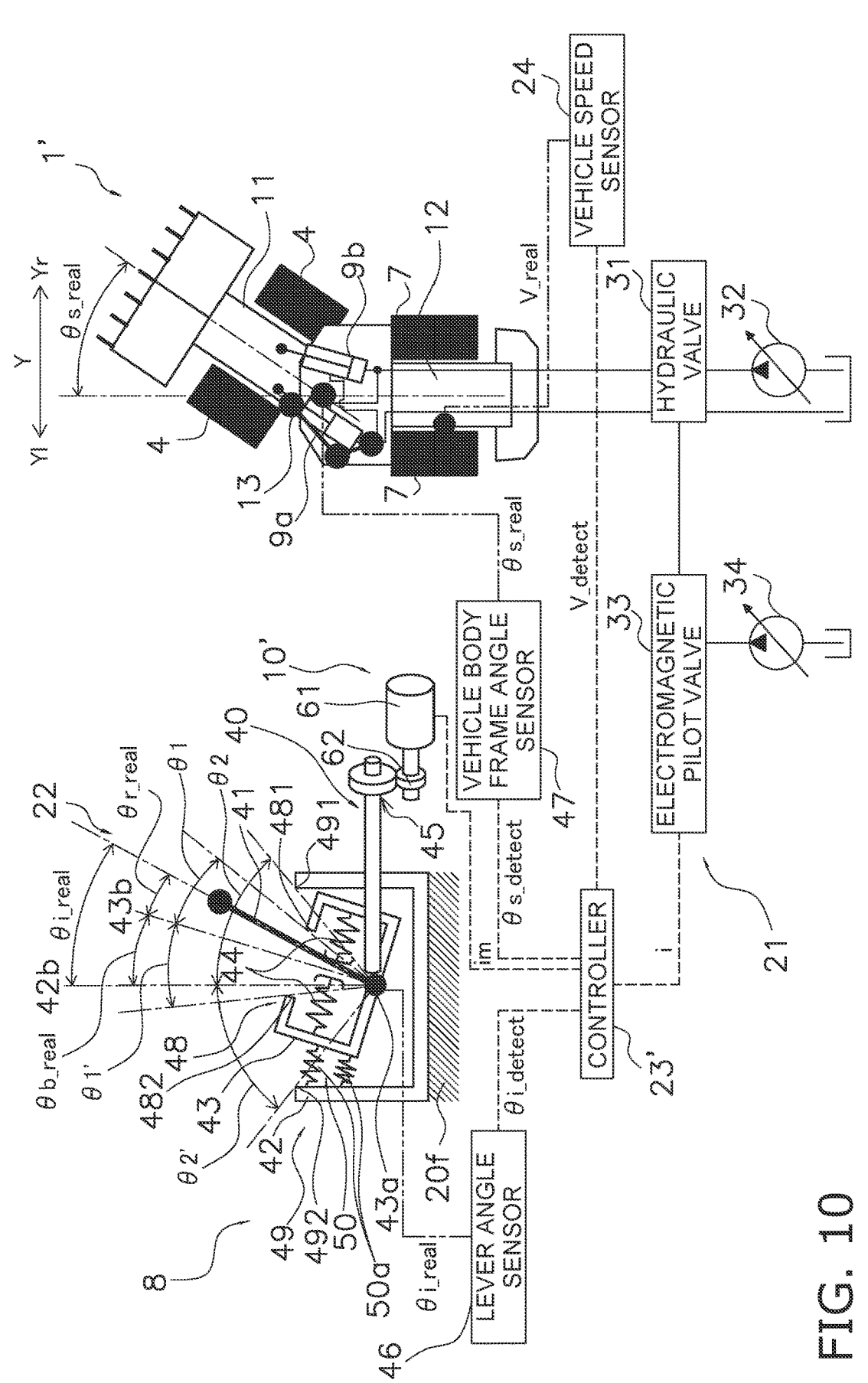
FIG. 10 is a configuration diagram showing a steering system of a wheel loader of another exemplary embodiment according to the present disclosure.

FIG. 10 is a view showing the configuration of the steering system 8 and the transmission mechanism 10' of the second embodiment.

The transmission mechanism 10' of the second embodiment transmits information on the vehicle body frame angle θs_real to the base member 43 via electrical means.

The transmission mechanism 10' of the second embodiment includes an electric motor 61 and an output gear 62 (an example of a motor drive transmission section). The electric motor 61 is driven based on a command from the controller 23'. The output gear 62 is fixed to the output shaft of the electric motor 61 and meshes with the gear of the transmission section 45. For example, backlash may occur between the output gear 62 and the gear of the transmission section 45.

Figure 11:
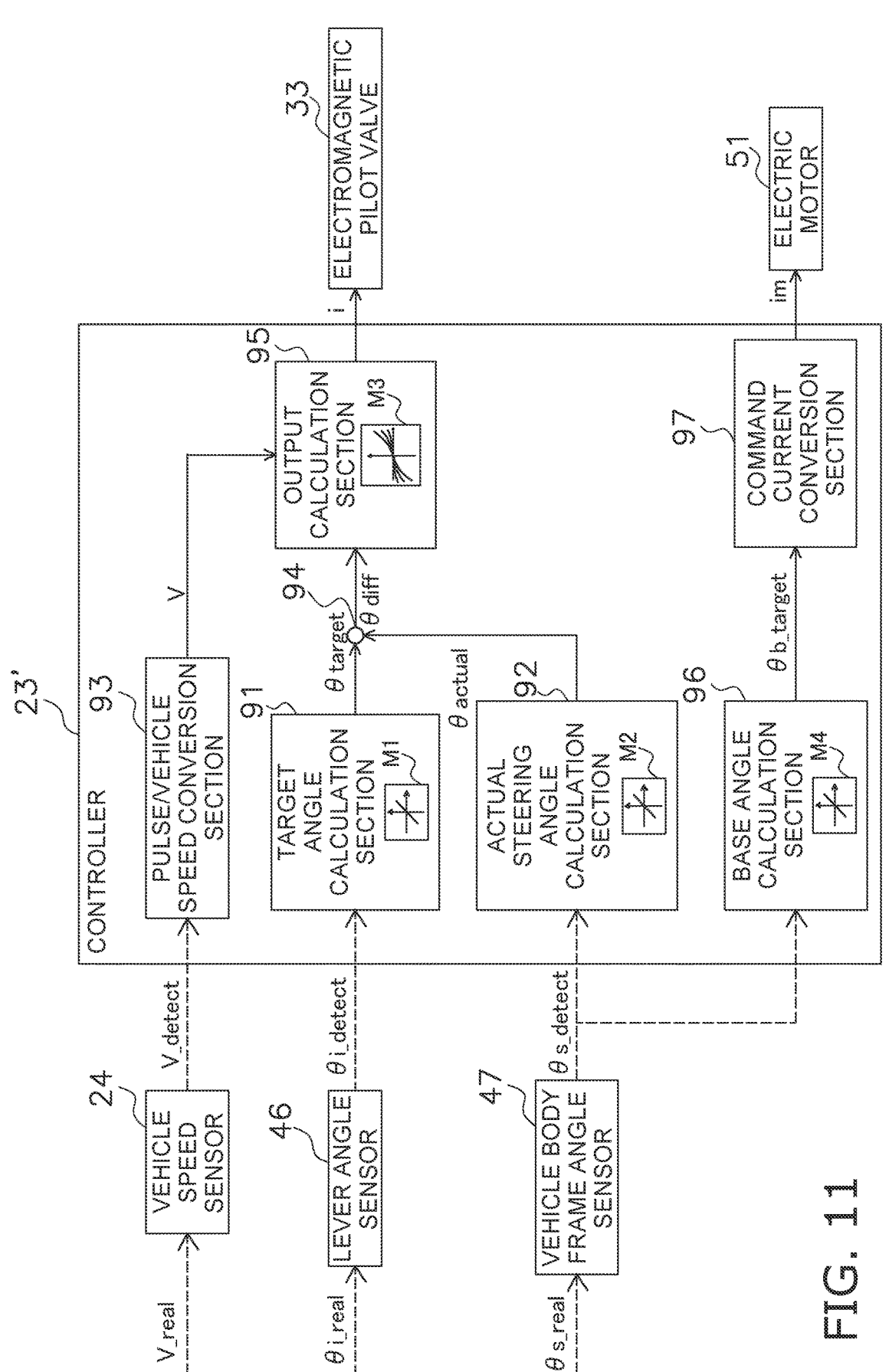
FIG. 11 is a block diagram showing input/output and calculation of a controller of FIG. 10.

FIG. 11 is a block diagram showing the configuration of the controller 23' of the second embodiment. The controller 23' shown in FIG. 11 is further provided with a base angle calculation section 96 and a command current conversion section 97 as compared with the controller 23 of the first embodiment. The base angle calculation section 96 calculates the target angle θb_target of the base member 43 from the detection value θs_detect of the vehicle body frame angle sensor 47 using the map M4.

Figure 12A:
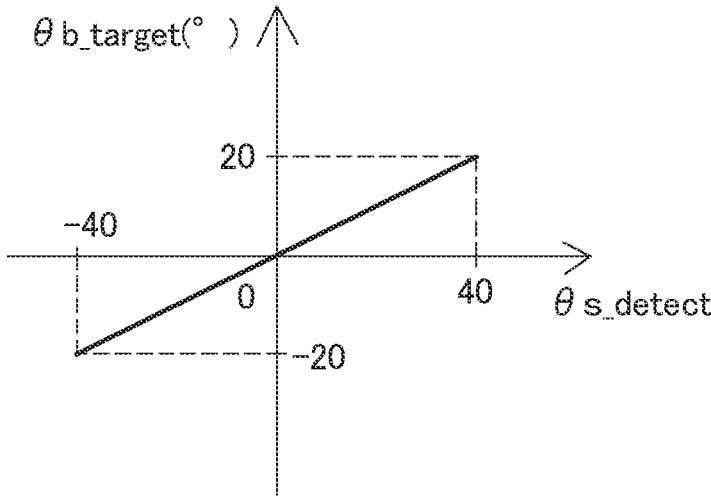
FIG. 12A is a diagram showing an example of the map of FIG. 11.
Figure 12B:
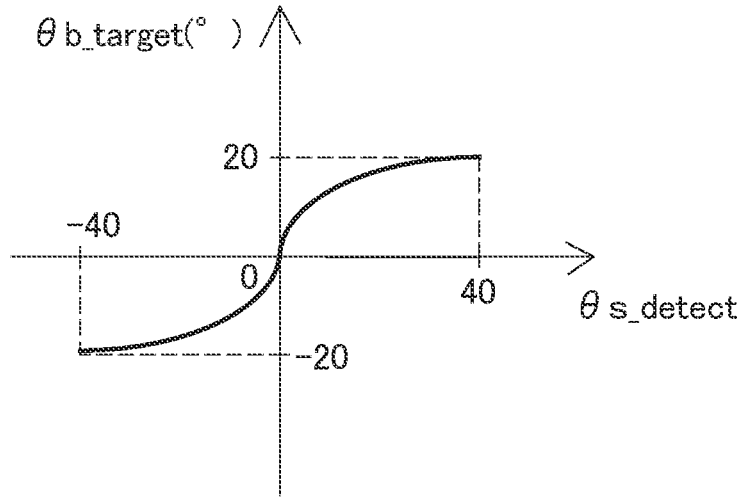
FIG. 12B is a diagram showing an example of the map of FIG. 11.

FIGS. 12A and 12B are diagrams showing an example of the map M4.

An example of the map M4 of each of FIGS. 12A and 12B shows an example of the correspondence between the detection value θs_detect of the steering angle and the target angle θb_target of the base member 43. In the map M4 of FIGS. 12A and 12B, the vehicle body frame angle θs_real on the horizontal axis of FIGS. 5A and 5B is replaced with the detection steering angle θs_detect, and the base angle θb_real on the vertical axis is replaced with the target angle θb_target of the base member 43.

The command current conversion section 97 converts the target angle θb_target calculated by the base angle calculation section 96 into a command current value im to the electric motor 61, and transmits the command current value im to the electric motor 51. The electric motor 51 rotates the base member 43 based on the command current value im, and the actual base angle θb_real of the base member 43 becomes the target angle θb_target.

In this way, the controller 23' transmits the command current value im to the electric motor 61 so that the base angle θb_real of the base member 43 becomes the target angle θb_target of the base member 43 calculated based on the map M4. The command from the controller 23' to the electric motor 51 may be performed with wired or wireless.

The wheel loader of the first embodiment includes a vehicle body frame 2, a transmission mechanism 10, a support section 42, a movable section 40, a joystick lever 41, and an urging mechanism 50. The wheel loader of the second embodiment includes a vehicle body frame 2, a transmission mechanism 10', a support section 42, a movable section 40, a joystick lever 41, and an urging mechanism 50. The transmission mechanism 10 transmit the movement of the vehicle body frame 2. The transmission mechanism 10' transmit the movement of the vehicle body frame 2. The support section 42 is fixed with respect to the vehicle body frame 2. The movable section 40 is movably supported with respect to the support section 42 and is connected to the transmission mechanism 10, and the movement of the vehicle body frame 2 is input the movable section 40. The movable section 40 is movably supported with respect to the support section 42 and is connected to the transmission mechanism 10', and the movement of the vehicle body frame 2 is input the movable section 40. The joystick lever 41 receives an operation to move with respect to the movable section 40. The urging mechanism 50 adjusts the movement of the movable section 40 with respect to the support section 42.

By adjusting the movement of the movable section 40 using the urging mechanism 50 in this way, even when backlash occurs in the transmission mechanisms 10 and 10', it is possible to prevent the movable section 40 from moving with the operation of the joystick lever 41. Therefore, it is possible to suppress the occurrence of looseness when the operator operates the joystick lever 41.

The support section 42 is preferably fixed with respect to the vehicle body frame 2, but may be installed at least on the vehicle body frame 2.

In the wheel loader 1 of the first embodiment, the movable section 40 includes a base member 43 and a transmission section 45. The base member 43 is rotatably supported by the support section 42. The transmission section 45 is connected to the transmission mechanism 10 and the base member 43, and transmits the movement of the vehicle body frame 2 to the base member 43. The wheel loader 1 further includes an urging member 44. The urging member 44 is interposed between the base member 43 and the joystick lever 41, and urges the joystick lever 41 to the base reference position 43b with respect to the base member 43.

By adjusting the movement of either the base member 43 or the transmission section 45 with respect to the support section 42, it is possible to prevent the base member 43 from moving with the operation of the joystick lever 41 even when backlash occurs in the transmission mechanism 10.

In the wheel loaders 1 of the first and second embodiments, the urging mechanism 50 is disposed between the support section 42 and the base member 43, and urges the base member 43 in either of the rotatable directions.

By urging the base member 43 to either one of the rotation directions in this way even when backlash occurs in the transmission mechanisms 10 and 10', it is possible to prevent the base member 43 from moving with the operation of the joystick lever 41

In the wheel loaders 1 of the first and second embodiments, the urging mechanism 50 includes a spring member 50a connected to the support section 42 and the movable section 40.

By urging the movable section 40 with such a spring member 50a, it is possible to prevent the base member 43 from moving with the operation of the joystick lever 41 even when backlash occurs in the transmission mechanisms 10 and 10'.

In the wheel loaders 1 of the first and second embodiments, the vehicle body frame 2 includes the rear frame 12 and the front frame 11. The front frame 11 rotates with respect to the rear frame 12. The transmission mechanism 10 transmits the rotational movement of the front frame 11 with respect to the rear frame 12 to the movable section 40. The transmission mechanism 10' transmits the rotational movement of the front frame 11 with respect to the rear frame 12 to the movable section 40.

This makes it possible to improve the operation feeling in the articulated wheel loader 1.

The wheel loader 1 of the second embodiment further includes a vehicle body frame angle sensor 47. The vehicle body frame angle sensor 47 detects the rotation angle of the front frame 11 with respect to the rear frame 12. The transmission mechanism 10' includes the electric motor 61 and the output gear 62. The output gear 62 transmits the output of the electric motor 61 to the movable section 40. The wheel loader 1 further includes a controller 23'. The controller 23' drives the electric motor 61 based on the detection value θs_detect of the vehicle body frame angle sensor 47.

As a result, in the articulated wheel loader 1, the rotation angle of the front frame 11 with respect to the rear frame 12 can be transmitted to the movable section 40 via the electric motor 61.

The steering device 22 of each of the first and second embodiments includes a support section 42, a movable section 40, a joystick lever 41, and an urging mechanism 50. The support section 42 can be fixed with respect to the vehicle body frame 2. The movable section 40 is movably supported with respect to the support section 42 and is connected to transmission mechanism 10 that transmit the movement of the vehicle body frame 2. The movable section 40 is movably supported with respect to the support section 42 and is connected to transmission mechanism 10' that transmit the movement of the vehicle body frame 2. The operation of the vehicle body frame 2 is input to the movable section 40. The joystick lever 41 receives an operation to move with respect to the movable section 40. The urging mechanism 50 adjusts the movement of the movable section 40 with respect to the support section 42.

By adjusting the movement of the movable section 40 with the urging mechanism 50 in this way, even when backlash occurs in the transmission mechanisms 10 and 10', it is possible to prevent the movable section 40 from moving with the operation of the joystick lever 41. Therefore, it is possible to suppress the occurrence of looseness when the operator operates the joystick lever 41.

The support section 42 is preferably fixed with respect to the vehicle body frame 2, but may be installed at least on the vehicle body frame 2.

OTHER EMBODIMENTS

While an embodiment of the present disclosure has been explained above, the present disclosure is not limited to the above embodiments and various changes are possible within the scope of the present disclosure.

In the above first and second embodiments, the spring member 50a of the urging mechanism 50 is provided between the support section 42 and the base member 43, but is not limited to this, and the spring member 50a may be provided between the transmission section 45 and the support section 42 or the vehicle body frame 2. One end of the spring member 50a is fixed to the transmission section 45. The other end of the spring member 50a may be fixed to the support section 42 or the vehicle body frame 2. The other end of the spring member 50a is not only directly fixed to the support section 42 or the vehicle body frame 2 but also indirectly fixed to the support section 42 or the vehicle body frame 2 via another member.

In the above first and second embodiments, the lever angle sensor 46 for detecting the rotation angle of the joystick lever 41 with respect to the support section 42 is provided, but instead of the lever angle sensor 46, a lever/vehicle body frame difference angle sensor 146 that detects an angle of the joystick lever 41 with respect to the base member 43 may be provided.

The actual relative angle θr_real of the joystick lever 41 with respect to the base member 43 corresponds to the difference between the actual lever angle θi_real of the joystick lever 41 with respect to the support section 42 and the actual base angle θb_real of the base member 43 with respect to the support section 42. The actual base angle θb_real of the base member 43 corresponds to the vehicle body frame angle θs_real by the transmission mechanism 10.

Therefore, the difference angle θdiff can be calculated from the angle of the joystick lever 41 with respect to the base member 43 and the electromagnetic pilot valve control current output i can be determined, and a command can be given to the electromagnetic pilot valve 33.

In the wheel loaders 1 of the above first and second embodiments, the vehicle body frame angle sensor 47 that detects the vehicle body frame angle θs_real is provided, but a base member angle sensor that detects the rotation angle of the base member 43 may be provided instead of the vehicle body frame angle sensor 47.

While in the above first and second embodiments, the amount of oil supplied from the hydraulic valve 31 to the steering cylinders 9*a* and 9*b* is controlled according to the pilot pressure input from the electromagnetic pilot valve 33, the oil from the electromagnetic pilot valve 33 may be directly supplied to the steering cylinders 9*a* and 9*b* without going through the hydraulic valve 31. That is, an electromagnetic main valve may be used instead of the electromagnetic pilot valve 33.

In the above first and second embodiments, the range of the base member angle (angle scale) and the range of the lever angle (angle scale) are narrower than the range of the vehicle body frame angle (angle scale), but may be the same as the range of the vehicle body frame angle or may be larger than the range of the vehicle body frame angle. However, it is preferable that the range of the base plate angle (angle scale) and the range of the lever angle (angle scale) is narrower than the range of the vehicle body frame angle (angle scale) because the operator's operation range is narrow and it is easy to operate.

In the above first and second embodiments, the wheel loader 1 has been described as an example of the work vehicle, but an articulated dump truck, a motor grader, or the like may be used.

In the above first and second embodiments, only the joystick lever 41 has been described, but a steering wheel may be provided. A signal due to the rotation of the steering wheel is input to the controller 23, and the electromagnetic pilot valve 33 is operated based on the rotation.

The work machine and the steering device of the present disclosure have an effect capable of improving the operation feeling, and are useful as a wheel loader or the like.

The invention claimed is:

1. A work machine comprising:
   a body;
   a movement transmitter configured to transmit a movement of the body;
   a support section installed with respect to the body;
   a movable section movably supported by the support section, the movable section being connected to the movement transmitter, the movement of the body being input to the movable section;
   an operating member configured to accept an operation to move with respect to the movable section, the operating member including a joystick lever or a steering wheel; and
   an urging mechanism configured to adjust a movement of the movable section with respect to the support section, the urging mechanism including a first spring member,
   the body including
      a first frame on which the support section is installed, and
      a second frame configured to rotate with respect to the first frame,
   the movement transmitter being configured to transmit a rotational movement of the second frame with respect to the first frame to the movable section, and
   the urging mechanism being configured to bias the movable section against the support section.

2. The work machine according to claim 1, further comprising
   an urging member including a second spring member,
   the movable section including
      a base rotatably supported by the support section, and
      a transmitter connected to the movement transmitter and the base, the transmitter
         being configured to transmit the movement of the body to the base,
   the urging member being interposed between the base and the operating member and urging the operating member to a predetermined position with respect to the base.

3. The work machine according to claim 2, wherein
   the urging mechanism is disposed between the support section or the body and the base, and urges the base in either direction about a rotational axis.

4. The work machine according to claim 2, wherein
   the urging mechanism is disposed between the support section or the body and the transmitter.

5. The work machine according to claim 4, wherein
   the first spring member of the urging mechanism is connected to the support section and the movable section.

6. The work machine according to claim 2, wherein
   the first spring member of the urging mechanism is connected to the support section and the movable section.

7. The work machine according to claim 1, wherein
   the first spring member of the urging mechanism is connected to the support section and the movable section.

8. The work machine according to claim 1, further comprising
   a vehicle body frame angle sensor configured to detect a rotation angle of the second frame with respect to the first frame, and
   a controller,
   the movement transmitter including
      an electric motor, and
      a motor drive transmitter configured to transmit an output of the electric motor to the movable section,
   the controller being configured to drive the electric motor based on a detection value of the vehicle body frame angle sensor.

9. The work machine according to claim 8, wherein
   the movable section includes a base rotatably supported by the support section, the movable section being connected to the movement transmitter and being configured to transmit the movement of the body to the base, an urging member is interposed between the base and the operating member, the urging member being configured to urge the operating member to a predetermined position relative to the base, the urging member including a second spring member, and the controller is configured to drive the electric motor to rotate the base so that a rotation angle of the base relative to the support section corresponds to the rotation angle detected by the vehicle body frame angle sensor.

10. A steering device comprising:

a support section configured to be installed with respect to a body;

a movable section movably supported by the support section, the movable section being connected to a movement transmitter, a movement of the body being input to the movable section;

an operating member configured to accept an operation to move with respect to the movable section, the operating member including a joystick lever or a steering wheel; and an urging mechanism configured to adjust a movement of the movable section with respect to the support section, the urging mechanism including a spring member, the body including a first frame on which the support section is installed, and a second frame configured to rotate with respect to the first frame, the movement transmitter being configured to transmit a rotational movement of the second frame with respect to the first frame to the movable section, the urging mechanism being configured to bias the movable section against the support section.

* * * * *